United States Patent
Lu et al.

(10) Patent No.: US 8,339,093 B2
(45) Date of Patent: *Dec. 25, 2012

(54) SYSTEM AND METHOD OF DYNAMIC REGULATION OF REAL POWER TO A LOAD

(75) Inventors: Bin Lu, Kenosha, WI (US); Charles John Luebke, Sussex, WI (US); Joseph Charles Zuercher, Brookfield, WI (US); John Charles Merrison, Milwaukee, WI (US); Thomas M. Ruchti, Pewaukee, WI (US)

(73) Assignee: Eaton Corporation, Cleveland, OH (US)

( * ) Notice: Subject to any disclaimer, the term of this patent is extended or adjusted under 35 U.S.C. 154(b) by 452 days.

This patent is subject to a terminal disclaimer.

(21) Appl. No.: 12/619,874

(22) Filed: Nov. 17, 2009

(65) Prior Publication Data

US 2010/0315033 A1 Dec. 16, 2010

Related U.S. Application Data

(60) Provisional application No. 61/186,270, filed on Jun. 11, 2009.

(51) Int. Cl.
*H02P 23/00* (2006.01)
(52) U.S. Cl. ........ 318/807; 318/811; 318/802; 318/727; 318/778; 318/432; 322/22; 363/34; 363/35; 363/37; 363/41; 363/95; 327/175; 331/25
(58) Field of Classification Search .......... 318/801–809, 318/700, 701, 778, 779, 430, 811, 825, 432, 318/798, 727, 800; 322/22; 363/34, 35, 363/37, 41, 95–98; 327/175
See application file for complete search history.

(56) References Cited

U.S. PATENT DOCUMENTS 4,052,648 A 10/1977 Nola
(Continued)

FOREIGN PATENT DOCUMENTS

EP 0330477 A2 8/1989

OTHER PUBLICATIONS

Jian et al., "Characteristic Induction Motor Slip Values for Variable Voltage Part Load Performance Optimization," IEEE Transactions on Power Apparatus and Systems, vol. PAS-102, No. 1, pp. 38-46, Jan. 1983.

(Continued)

*Primary Examiner* — Walter Benson
*Assistant Examiner* — Jorge Carrasquillo
(74) *Attorney, Agent, or Firm* — Ziolkowski Patent Solutions Group, SC

(57) ABSTRACT

A system and method for controlling an AC motor drive includes a control system programmed with an energy algorithm configured to optimize operation of the motor drive. Specifically, the control system receives input of an initial voltage-frequency command to the AC motor drive, receives a real-time output of the AC motor drive generated according to the initial voltage-frequency command, and determines a real-time value of a motor parameter based on the real-time output of the AC motor drive. The control system also inputs a plurality of modified voltage-frequency commands to the AC motor drive, determines the real-time value of the motor parameter corresponding to each of the plurality of modified voltage-frequency commands, and identifies an optimal value of the motor parameter based on the real-time values of the motor parameter. The control system maintains an input of a current modified voltage-frequency command when the real-time value of the motor parameter corresponds to the optimal value of the motor parameter.

25 Claims, 7 Drawing Sheets

U.S. PATENT DOCUMENTS

| | | | |
|---|---|---|---|
| 5,329,223 | A | 7/1994 | Riggio |
| 5,548,199 | A * | 8/1996 | Bidaud et al. ............... 318/802 |
| 5,646,499 | A | 7/1997 | Doyama et al. |
| 5,959,431 | A * | 9/1999 | Xiang ........................ 318/811 |
| 6,222,335 | B1 * | 4/2001 | Hiti et al. ................... 318/432 |
| 6,388,419 | B1 | 5/2002 | Chen et al. |
| 6,984,953 | B2 | 1/2006 | Quirion et al. |
| 7,449,860 | B2 * | 11/2008 | Sarlioglu et al. ............. 318/811 |
| 7,468,595 | B2 * | 12/2008 | Lee et al. .................... 318/802 |
| 2005/0046489 | A1 * | 3/2005 | Cranford et al. ............ 331/25 |
| 2006/0038530 | A1 * | 2/2006 | Holling ....................... 318/807 |
| 2006/0071629 | A1 | 4/2006 | Holling et al. |
| 2007/0024231 | A1 | 2/2007 | Lee et al. |
| 2010/0315034 | A1 * | 12/2010 | Lu et al. ..................... 318/802 |

OTHER PUBLICATIONS

Abrahamsen et al., "On the Energy Optimized Control of Standard and High-Efficiency Induction Motors in CT and HVAC Applications," Annual Meeting, New Orleans, Lousiana, Oct. 5-9, 1997, pp. 621-628.

Performance Testing Results for FlexMod Controller, Advanced Energy, Nov. 2006.

Kioskeridis et al., "Loss Minimization in Scalar-Controlled Induction Motor Drives with Search Controllers," IEEE Transactions on Power Electronics, vol. 11, No. 2, pp. 213-220, Mar. 1996.

* cited by examiner

SYSTEM AND METHOD OF DYNAMIC REGULATION OF REAL POWER TO A LOAD

CROSS REFERENCE TO RELATED APPLICATION

The present application is a non-provisional of, and claims priority to, U.S. Provisional Application 61/186,270 filed Jun. 11, 2009, which is incorporated herein by reference.

BACKGROUND OF THE INVENTION

The present invention relates generally to AC motors and, more particularly, to a system and method for reducing real power usage of open-loop AC motor drive systems, which can include at least a motor drive, a motor, and a connected load.

Open-loop AC motor drives are typically programmed to operate based on a voltage/frequency (V/Hz) operating curve. Because the V/Hz settings of an open-loop motor drive is typically adjustable only while the drive is not in operation and/or the actual motor loading conditions are not known at time of drive commissioning, the V/Hz operating curve is typically a pre-set and static curve that is programmed during the initial installation and setup of the drive. The motor drive may be programmed with a first order or linear V/Hz operating curve to maintain a constant ratio between the voltage and frequency applied to the motor. Such an operating curve maintains a constant flux in the air-gap and, therefore, generates constant torque in the motor. Alternatively, a second order V/Hz curve may be selected, where the output torque is approximately proportional to the square of the motor speed. Some motor drives also provide preset user-programmable V/Hz settings to meet the requirement for special applications. Once programmed, the motor drive typically operates based on the pre-set operating curve during the lifetime of the drive unless an operator changes the drive setting at a later time.

Some drives today have energy saving options, such as "Flux Minimization" or "Flux Optimization." These options are often designed to dynamically seek a minimal current or flux in the motor, but not the overall motor input power. These options typically select a motor voltage which is between the linear V/Hz setting and the quadratic V/Hz setting.

Typically, the linear V/Hz curve, commonly referred as constant V/Hz curve, is the default setting of the majority of open-loop motor drives. While the linear V/Hz curve settings for a given motor drive are typically programmed to provide constant torque to the load, such constant torque output is not needed for many variable torque applications. Therefore, the V/Hz curve settings often result in wasted energy and inefficient operation of the motor drive system, especially the motor and its connected load.

Furthermore, because the V/Hz curve settings are static, the motor drive operates independently of any changes in operating conditions. Although some motor drives may allow a user to alter the V/Hz curve by, for example, adjusting the start, middle, and/or end points of the V/Hz curve, such programming cannot be performed automatically by the drive itself and may be completed only when the motor is shutdown. This typically requires a skilled technician who has a thorough understanding of the both motor drive and the loading profile of the specific motor and load application.

Another reason why an operator commissioning a drive typically selects a linear V/Hz curve is that the linear V/Hz curve provides constant torque and minimizes the risk that the actual torque using a non-linear V/Hz curve (e.g., second order curve) may not be sufficient to meet the load torque demand for variable torque applications. This is particularly true if the operator commissioning the drive does not fully understand the load profile of the motor application where the drive is installed. For example, in waste water treatment plants, the pump motors are often designed to meet the peak demand when heavy rain occurs in the summer. During the majority of the year, however, the load percentage of the pump motor can be very low. Using a second order V/Hz curve in this application may be risky because the second order V/Hz curve may not provide enough torque when a heavy rain event occurs. Also, the operator who commissions the drive is usually not the same person in a plant who is responsible for monitoring and controlling energy savings. Thus, there may be little incentive for the operator who commissions the drive to select a different V/Hz curve setting for energy savings over the standard linear V/Hz curve settings.

It would therefore be desirable to design an apparatus and method for dynamically adjusting the V/Hz operating curve of an open-loop AC motor drive during motor operation, so that the drive itself can determine an optimal voltage and frequency applied to the motor to minimize the motor input real power and achieve additional energy savings while maintaining stable motor operating conditions.

BRIEF DESCRIPTION OF THE INVENTION

The present invention provides a system and method for controlling an AC motor drive connected to a load that overcomes the aforementioned drawbacks.

In accordance with one aspect of the invention, a control system is provided for controlling an AC motor drive. The control system is programmed to input an initial voltage-frequency command to the AC motor drive, receive a real-time output of the AC motor drive generated according to the initial voltage-frequency command, and determine a real-time value of a motor parameter based on the real-time output of the AC motor drive. The control system is also programmed to input a plurality of modified voltage-frequency commands to the AC motor drive and determine the real-time value of the motor parameter corresponding to each of the plurality of modified voltage-frequency commands. The control system is further programmed to identify an optimal value of the motor parameter based on the real-time values of the motor parameter, and maintain an input of a current modified voltage-frequency command when the real-time value of the motor parameter corresponds to the optimal value of the motor parameter.

In accordance with another aspect of the invention, a method for controlling a motor drive output includes operating a motor drive according to a static voltage-frequency profile to generate an output power and determining a value of a specified motor parameter corresponding to the static voltage-frequency profile. The method also includes selectively modifying the static voltage-frequency profile during operation of the motor drive to generate a reduced motor input power. The step of selectively modifying the default voltage-frequency profile includes adjusting a voltage-frequency setting during operation of the motor drive such that a reduced motor input power is generated according to a dynamic voltage-frequency profile, determining a value of the specified motor parameter for each voltage-frequency setting of the dynamic voltage-frequency profile, and operating the motor drive at a voltage-frequency setting corresponding to a peak value of the specified motor parameter.

In accordance with yet another aspect of the invention, a motor drive is configured to supply power to a load. The motor drive includes an inverter designed to provide power to the load and a controller operationally connected to control operation of the inverter. The controller is configured to cause the inverter to operate according to an initial voltage-frequency setting, adjust the voltage-frequency setting during operation of the motor drive to cause the inverter to operate according to each of a plurality of varied voltage-frequency settings, and monitor a real-time value of a motor parameter corresponding to each voltage-frequency setting. The controller is further configured to identify an optimal value for the motor parameter based on the monitored real-time values of the motor parameter and cause the inverter to operate according to the voltage-frequency setting corresponding to the identified optimal value for the motor parameter.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE INVENTION

Several embodiments of the invention are set forth that relate to a system and method of controlling an AC motor drive connected to a load that overcomes the aforementioned drawbacks. These embodiments of the invention are directed to an energy-optimizing control system for open-loop motor drives encompassing a plurality of structures and control schemes.

Figure 1:
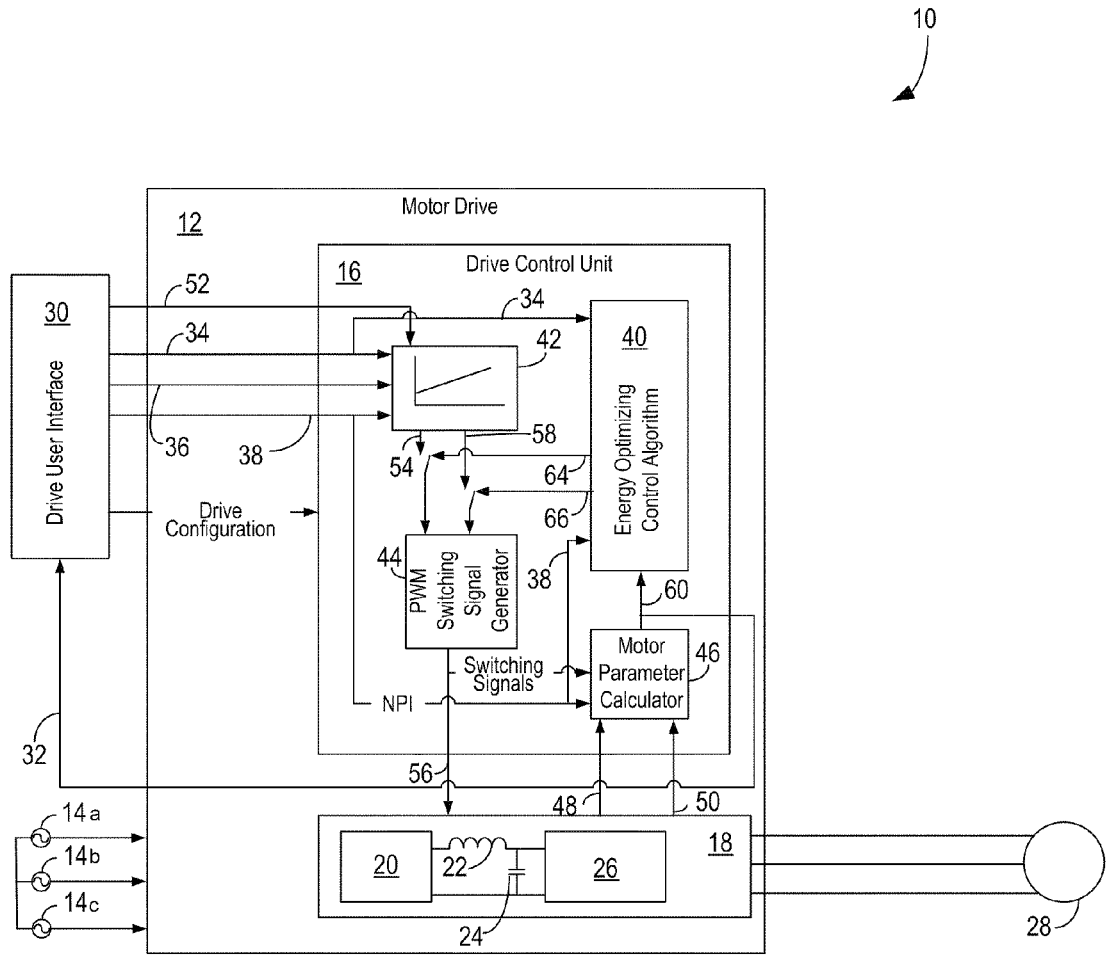
FIG. 1 is schematic of a control system including a motor drive system according to one aspect of the invention.

A general structure of a motor drive system 10 and an associated AC motor drive 12 is shown in FIG. 1. The motor drive 12 may be configured, for example, as an adjustable speed drive designed to receive a three-phase AC power input 14a-14c, rectify the AC input, and perform a DC/AC conversion of the rectified segment into a three-phase alternating voltage of variable frequency and amplitude that is supplied to a load. According to one embodiment, a drive control unit 16 may be integrated within motor drive 12 and function as part of the internal logic of motor drive 12. Alternatively, drive control unit 16 may be embodied in an external module distinct from motor drive 12, and receive data therefrom (e.g., voltage and/or current signals), as described in more detail with respect to FIGS. 2 and 3.

Referring to FIG. 1, in an exemplary embodiment, motor drive 12 includes a drive power block unit 18, which may, for example, contain a uncontrollable or controllable rectification unit 20 (uncontrolled AC to DC), a filtering inductor 22, a DC bus capacitor or battery 24, and a pulse width modulation (PWM) inverter 26 (DC to controlled AC). Alternatively, drive power block unit 18 may be provided without such a rectification unit such that the DC bus is directly connected to the inverter. A drive power block unit may be provided without a rectification unit when applied to an uninterruptible power supply (UPS), for example.

Motor drive 12 receives the three-phase AC input 14a-14c, which is fed to the rectification unit 20. The rectification unit 20 converts the AC power input to a DC power such that a DC bus voltage is present between rectification unit 20 and PWM inverter 26, which inverts and conditions the DC power to a controlled AC power for transmission to an AC motor 28. PWM inverter 26 includes a plurality of switches (not shown) and is configured to operate according to a PWM control scheme, such as, for example, a Space Vector Modulation (SVM) control scheme or a Sinusoidal-Triangle PWM control scheme, to control the plurality of switches, thereby producing the controlled AC power output. According to an exemplary embodiment, PWM inverter 26 is configured to operate according to a SVM control scheme.

Drive control unit 16 operates to generate the SVM control scheme for the PWM inverter 26. More specifically, the SVM control scheme for the PWM inverter 26 is generated by motor drive system 10 based on a voltage-frequency (V/Hz) setting or command (i.e., V/Hz profile or curve) used for operating motor drive 12. According to an exemplary embodiment of the invention, motor drive system 10 is programmed to dynamically adjust the voltage and frequency applied to motor 28 based on motor or load demand, which in effect dynamically adjusts the shape or profile of the pre-set V/Hz curve (and the associated SVM control scheme) internal to motor drive 12.

Motor drive 12 further includes a drive user interface 30 or drive control panel, configured to input motor parameters 32 and output a frequency reference 34, a boost voltage 36, which is which is used to produce starting torque to accelerate motor from zero speed, and motor nameplate information (NPI) 38. User interface 30 is also used to display a list of motor operating parameters, such as, for example, motor output voltage (rms), motor current (rms), motor input power, speed, torque, etc., to the user for monitoring purposes.

As shown in FIG. 1, drive control unit 16 includes a control algorithm module 40, an existing or preset V/Hz curve 42, a signal generator 44 for generating the SVM control, and a motor parameter calculator 46. Drive control unit 16 functions to receive an output from drive power block unit 18, determine and monitor motor parameter(s), and determine an optimal voltage and frequency based on the determined motor parameter(s) to generate a SVM control scheme for operating motor drive 12.

According to an embodiment of the invention, drive control unit 16 receives DC bus voltage signal 48 and motor input current signals 50 from drive power block unit 18. Motor input voltages are calculated using DC bus voltage signal 48 and PWM switching signals 56. Signals 50 and motor input voltage signals may be obtained from the AC power output of the motor drive 12, such as by way of wired or wireless sensors that transmit the real-time voltage signals 48 and real-time current signals 50 thereto. Alternatively, motor parameter calculator 46 may receive signals indicating motor speed from a speed sensor or estimator integrated in motor drive 12. Drive control unit 16 may also receive boost voltage signal 36, which is used to produce starting torque to accelerate AC motor 28 from zero speed, and a speed reference signal 52. Based on received signals 36, 48, 50, drive control unit 16 transmits a series of switching signals or switching commands 54 to PWM inverter 26, thereby forming a SVM control scheme.

In operation, drive control unit 16 of motor drive system 10 operates in a default mode/setting upon a start-up or reset of the motor drive 12. Operating at the default setting, drive control unit 16 monitors DC bus voltage signal 48 and current signals 50 from sensors, determines an operating point of existing V/Hz curve block 42 based on DC bus voltage signal 48 and current signals 50 and transmits default switching commands 54 to PWM inverter 26 based on the pre-set operating point. According to one embodiment, drive control unit 16 receives a frequency (or speed) command from an input device (not shown) in order to generate a frequency command and a voltage magnitude command. The voltage magnitude command is given by a function of the frequency command, typically referred to as a V/Hz curve. Drive control unit 16 generates a three phase voltage command based on the frequency command, which is used to control switching of an array of switches in PWM inverter 26. Specifically, signal generator 44 receives a voltage command 56 and a frequency command 58 from existing V/Hz curve 42 and generates six PWM signals to control six corresponding switches in PWM inverter 26. In other words, motor drive system 10 transmits voltage-frequency commands according to the static pre-set V/Hz profile in default mode.

Upon an initial operation in default mode, drive control unit 16 then transitions to operate in an energy-optimizing mode wherein control algorithm module 40 bypasses existing V/Hz curve block 42 and receives frequency reference 34, boost voltage signal 36, and NPI 38 from drive user interface 30 as inputs. Control algorithm module 40 also receives estimated or calculated motor parameters 60 from motor parameter calculator 46. In the energy-optimizing mode, control algorithm module 40 uses the received DC bus voltage signal 48 and/or current signals 50 and NPI 38 to calculate or estimate selected reference real-time motor parameters. In one embodiment of the invention, the real-time motor parameters may be an average motor rms voltage, an average motor rms current, an instantaneous motor input power factor, a motor efficiency, or a motor slip (or speed). Control algorithm module 40 then determines if the optimal operation is achieved by comparing the determined real-time motor parameter to a nominal or reference motor parameter 62, as described in more detail with respect to FIG. 4. Based on the comparison of motor parameters, control algorithm module 40 transmits a modified voltage command 64 and/or a frequency command 66 to signal generator 44. Using voltage and frequency commands 64, 66, received from control algorithm module 40, signal generator 44 transmits switching signal 54 to drive power block unit 18. Responsive thereto, drive power block unit 18 synthesizes AC voltage waveforms with a fixed frequency and amplitude for delivery to AC motor 28.

In energy-optimizing mode, drive control unit 16 is configured to continuously monitor motor drive system 10 and transmit a series of modified switching commands 54 to PWM inverter 26. Specifically, drive control unit 16 calculates motor input voltages using DC bus voltage signal 48 and PWM switching signals 56 and receives current signals 50 from sensors. Drive control unit 16 calculates or estimates one or more real-time motor parameters from the calculated motor input voltages, current signals 50, and NPI 38 and compares real-time motor parameter(s) to previously acquired real-time motor parameters to ascertain a trend or rate-of-change of the real-time motor parameter(s). Control module 40 then generates incremented (or decremented) frequency command 66 and/or incremented voltage (or decremented) command 64 for each execution cycle and transmits the incremented voltage-frequency commands 64, 66 to signal generator 44. For example, control module 40 may increment only one command 64, 66, for example frequency command 66, while maintaining the previous voltage command 64, and transmit incremented frequency command 66 and non-incremented voltage command 64 to signal generator 44. Alternatively, control module 40 may increment both frequency command 66 and voltage command 64 and transmit both incremented commands 64, 66 to signal generator 44. Using the incremented voltage-frequency commands, signal generator 44 modifies switching commands 54 transmitted to PWM inverter 26 such that the real power input to AC motor 28 in energy-optimizing mode is lower than the real power input using the original static V/Hz curve setting in default mode.

According to an exemplary embodiment, the trend of the real-time motor parameter is monitored to determine if the real-time value of the motor parameter is at a peak value (i.e., where the rate-of-change of the real-time motor parameter switches from positive to negative or from negative to positive). As used herein, "peak" refers to either a maximum point or a minimum point on a curve. For example, maximum peak may be used for power factor and efficiency, whereas minimum peak may be used for motor current. If the motor parameter trend indicates no change (i.e., zero slope) between the reference motor parameter and the real-time motor parameter, control module 40 determines that the real-time motor parameter is at a peak value and generates (i.e., maintains) a voltage-frequency command consistent with the voltage-frequency command from which the peak value motor parameter was obtained. According to this optimally maintained voltage-frequency command, the signal generator 44 is caused to generate corresponding switching commands 54 (i.e., a SVM control command) to cause the motor drive to operate at an optimal operation point at which real power input to AC motor 28 is minimized.

In energy-optimizing mode, drive control unit 16 is also configured to continuously monitor for system instability and undesirable operation. If system instability and/or undesirable operation is confirmed, drive control unit 16 transmits a series of modified switching commands switching commands 54 to PWM inverter 26. During energy-optimizing mode, the system may become unstable due to, for example, abrupt changes in the load. A system instability condition may be determined by monitoring for abrupt changes in the value or rate-of-change of motor current, power factor, or speed (or slip) signals or by monitoring the trend of real-time motor parameter(s), as discussed in detail below. By comparing the real-time motor parameter(s) and the ascertained trend of the real-time motor parameter(s) with their pre-defined boundaries, control module 40 determines if system instability or an undesirable operation is detected. If such system instability or an undesirable operation is detected, control module 40 may transmit modified voltage-frequency commands to signal generator 44 to attempt to regain system stability. Alternatively, control module 40 may enters a "master reset routine" to reset control of motor drive to the default mode within one or more execution periods and increment (or decrement) voltage command 64 to the original pre-set V/Hz curve or linear V/Hz curve, while transmitting the same frequency command 66 to signal generator 44 to reacquire and maintain system stability until the operating point of the load is considered stable. According to one embodiment, frequency command 66 may be held constant until a user or an external process controller demands a change in frequency reference 34.

Drive control unit 16 may also monitor real-time motor parameters for application-specific boundary conditions, which may be pre-set by an operator to indicate a real-time system condition that may not indicate an unstable or undesirable system condition, but nonetheless be undesirable for the specific application. For example, drive control unit 16 may monitor for a minimum voltage boundary, a maximum voltage boundary, a maximum current boundary, a maximum slip (minimum speed) boundary, a minimum power factor boundary, a maximum torque boundary, or a maximum motor temperature boundary.

Figure 6:
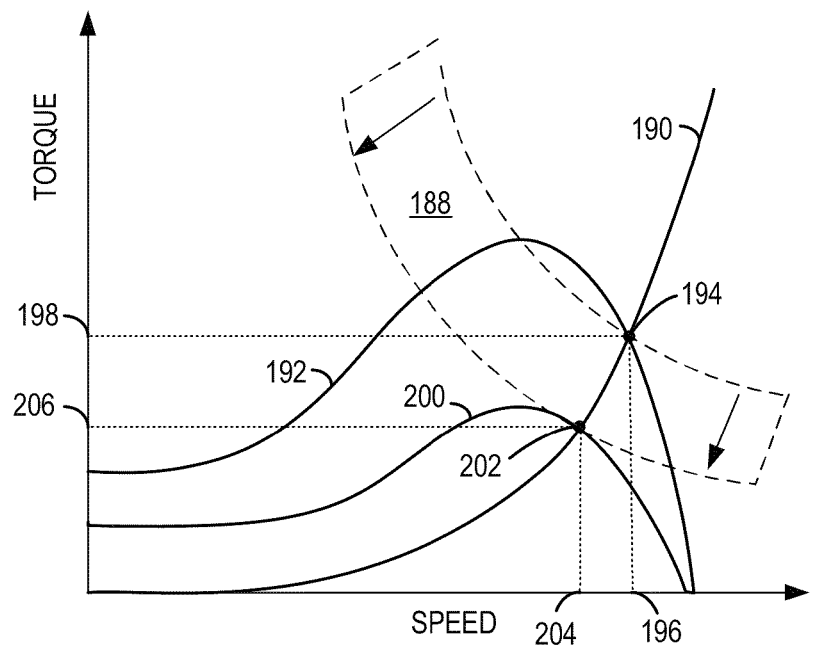
FIG. 6 is an exemplary graph illustrating energy savings for a given motor drive operated according to the motor drive control technique of FIG. 4 according to an embodiment of the invention.

During energy-optimizing mode, however, a reduced voltage command may cause a decrease in motor speed. Therefore, drive control unit 16 may be further programmed to monitor motor speed and increase the voltage-frequency commands 64, 66 such that the motor operates at the desired speed while operating in energy-optimizing mode according to a "slip compensation mode" such that a motor shaft speed is held constant at the synchronous speed of the frequency reference $f_{ref}$ 34. Assuming the actual motor fundamental frequency $f_1$ closely matches the drive frequency command $f_{cmd}$ 66 (i.e., $f_1 = f_{cmd}$), the motor synchronous speed $\omega_{syn}$ can be calculated according to:

$$\omega_{syn} = \frac{120 \times f_1}{p} = \frac{120 \times f_{cmd}}{p}, \quad \text{(Eqn. 1)}$$

where p is the number of poles of motor 28. As shown in FIG. 6, due to the actual loading condition of the load (i.e., the shape of the load characteristic curve), the actual motor shaft speed $\omega_r$ when the drive frequency command 66 is $f_{cmd}$ (thus the motor fundamental frequency is $f_1 = f_{cmd}$) is always slightly lower than the synchronous speed $\omega_{syn}$. The percentage difference between the synchronous speed $\omega_{syn}$ and motor shaft speed is defined according to:

$$s = \frac{\omega_{syn} - \omega_r}{\omega_{syn}}, \quad \text{(Eqn. 2)}$$

where s is motor slip. Therefore, in order to compensate the speed drop due to load, the drive frequency command 66 can be set slightly higher than frequency reference 34 so that the actual motor shaft speed equals to the synchronous speed of the original frequency reference 34. This is the "slip compensation mode."

The slip compensation mode may be used when the user or drive outer-loop controller expects the motor shaft speed to match the synchronous speed of the frequency reference 34 (in this case, frequency reference 34 is given as essentially a "speed reference.") For example, for a 4-pole induction motor, when a user sets frequency reference 34 at 40 Hz in the drive user interface, the user often expects the motor to operate at the synchronous speed of 40 Hz (i.e., 2400 rpm). However, if the drive sends a frequency command 64 of 40 Hz, the actual motor speed will be slightly lower than 2400 rpm due to actual loading condition (according to FIG. 6), for instance, at 2375 rpm. Using Eqn. 2, the slip of the motor may be calculated as $$\left(\frac{2400 - 2375}{2400}\right).$$

In order to operate the motor at a user expected 2400 rpm, the drive sends a frequency command 64, which slightly greater than the frequency reference 34 of 40 Hz, for example 40.2 Hz. Under this higher frequency the motor shaft speed is 2400 rpm that matches the user's "speed reference."

Still referring to FIG. 1, during energy-optimizing mode existing V/Hz curve block 42 may be dealt with in several ways according to embodiments of the invention. According to one embodiment, control algorithm module 40 may be implemented in drive application software, while the existing V/Hz curve block 42 may be implemented in drive firmware. In such an embodiment, existing V/Hz curve block 42 may continue to produce voltage and frequency commands, but such commands may not pass to signal generator 44. Alternatively, both control algorithm module 40 and existing V/Hz curve block 42 may be implemented in drive firmware. In this case, existing V/Hz curve block 42 may be disabled or removed.

Figure 2:
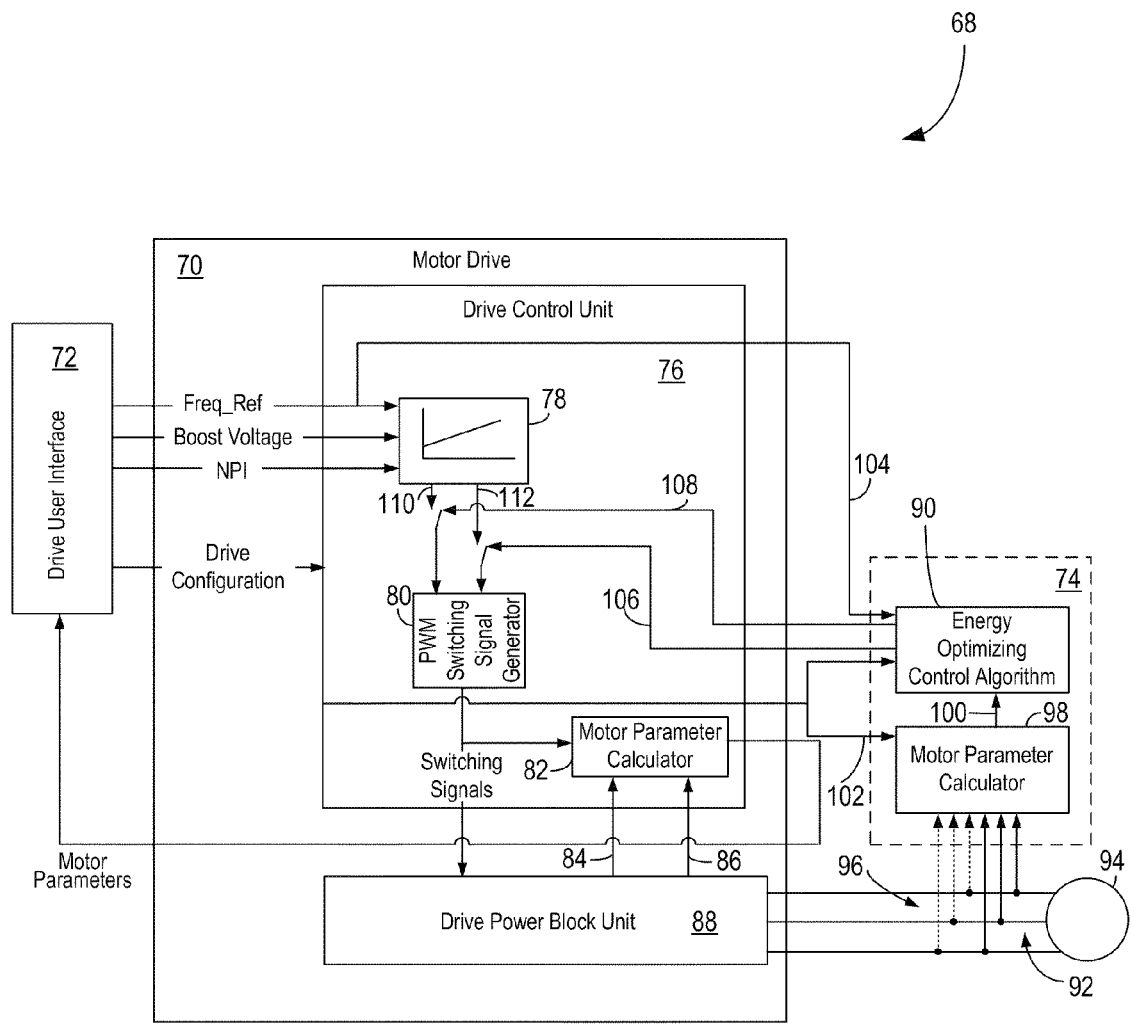
FIG. 2 is a schematic of a control system including a motor drive system according to another aspect of the invention.

Referring now to FIG. 2, the general structure of a motor drive system 68 is shown according to an embodiment of the invention. Motor drive system 68 includes an AC motor drive 70, a drive user interface 72, and a standalone external control module 74. A drive control unit 76 included within motor drive system 68 comprises a static V/Hz curve block 78, a signal generator 80, and a motor parameter calculator 82, which receives DC bus voltage signal 84 and motor current signals 86 from a drive power block unit 88.

Control module 74 includes an energy control algorithm module 90 as a separate hardware module external to the existing hardware of motor drive 70 and may be installed in an existing motor drive and exchange data through existing drive communications, such as, for example, ModBus, Device Net, Ethernet, and the like. Control module 74 uses a set of voltage sensors 92 to measure the three phase line-to-line voltages of a motor 94. Control module 74 also includes a set of current sensors 96 to measure the three phase currents of motor 94. Where no neutral point is available, control module 74 includes at least two current sensors for a three-wire system. As the three phase currents add to zero, the third current may be calculated from the other two current values. However, while a third sensor is optional, such sensor increases the accuracy of the overall current calculation.

Control module 74 also includes an internal motor parameters calculator 98, which calculates/estimates a set of reference motor parameters 100, such as, for example, rms voltage, rms current, slip (or speed), power factor, and efficiency, to be input to control algorithm module 90. Motor nameplate information (NPI) 102 is obtained from motor drive 70 through communications or inputted by a user in control module 74. A frequency reference 104 is also input to external control module 74 through drive communications.

Similar to the procedure described with respect to FIG. 1, during an energy-optimizing mode, the logic contained in control algorithm module 90 essentially replaces static V/Hz curve block 78. Control algorithm module 90 receives frequency reference 104 and NPI 102 from motor drive 70, as well as calculated/estimated reference motor parameters 100 from motor parameters calculator 98 as inputs. Module 90 generates a frequency command 106 and a voltage command 108 using these inputs and control module 74 sends these commands 106, 108 to signal generator 80.

According to this embodiment, since control algorithm module 90 is located externally from motor drive 70, static V/Hz curve block 78 may be kept as is, producing a set of preset voltage commands 110 and frequency commands 112. However, these preset commands 110, 112 are not passed to signal generator 80.

Figure 3:
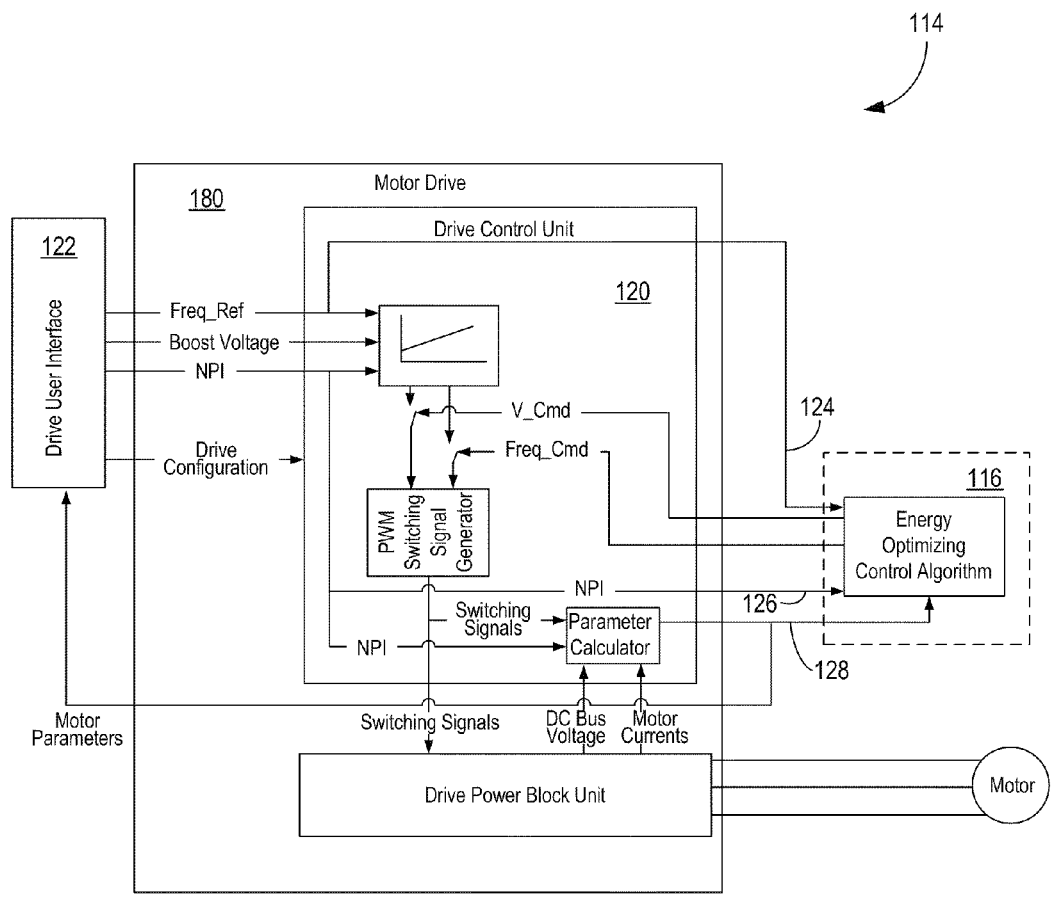
FIG. 3 is a schematic of a control system including a motor drive system according to yet another aspect of the invention.

FIG. 3 illustrates a motor drive system 114 including an external control module 116 according to another embodiment of the invention. Similar to the motor drive system described with respect to FIG. 2, motor drive system 114 includes a motor drive 118, a drive control unit 120, and a drive user interface 122. However, unlike the motor drive system of FIG. 2, external module 116 does not have its own voltage and current sensors or an internal motor parameter calculator. Instead, external module 116 obtains a frequency reference 124, a NPI 126, and calculated and/or estimated motor parameters 128 through drive communications. According to one embodiment, external module 116 may be implemented in an extension card slot of motor drive 118 to provide energy optimizing functionality to motor drive 118.

Figure 4:
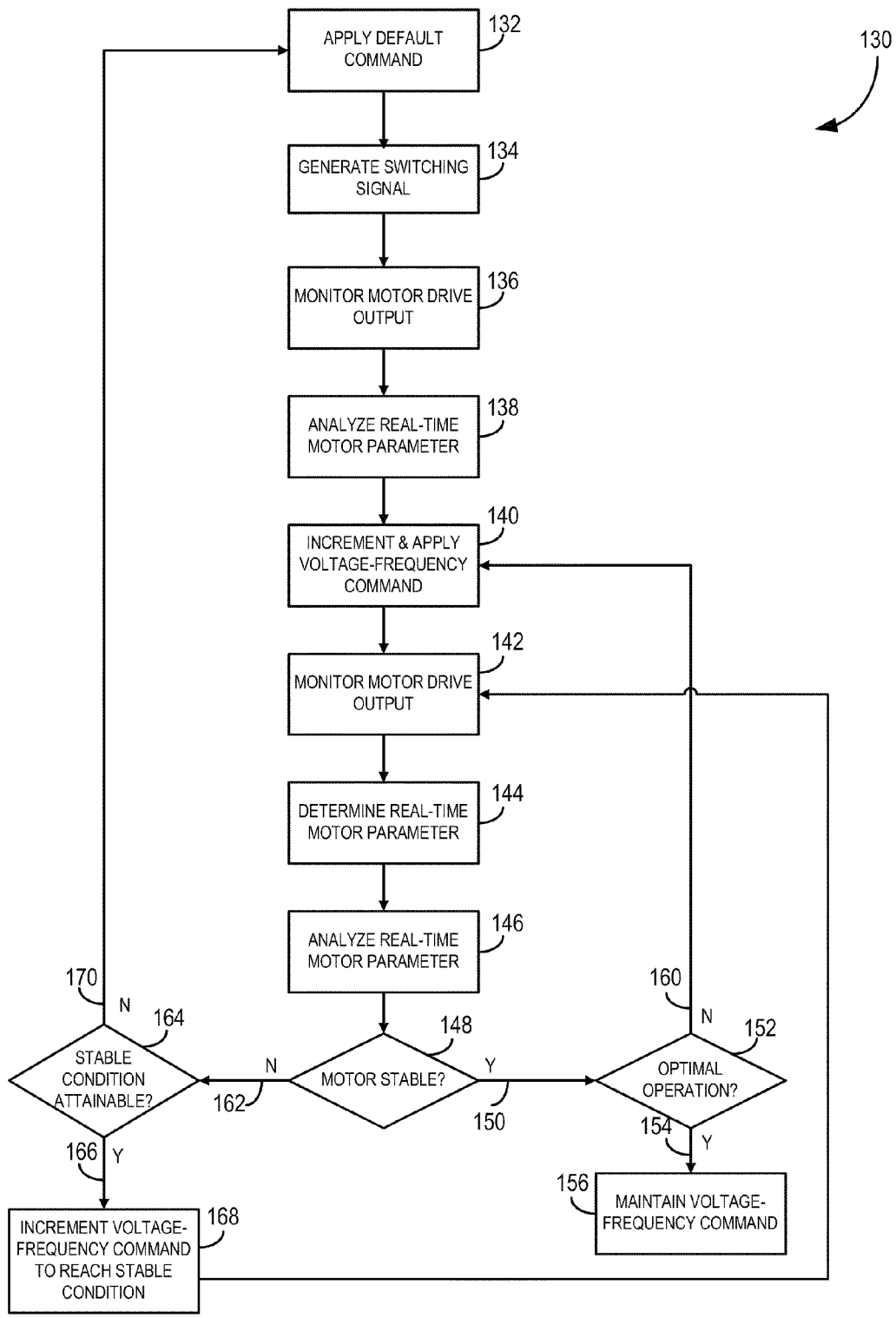
FIG. 4 is a flow chart setting forth exemplary steps of a motor drive control technique that may be implemented in any of motor drive systems of FIGS. 1-3 according to embodiments of the invention.

Referring now to FIG. 4, a controller implemented, energy-optimizing technique 130 for dynamically controlling a motor drive, such as AC motor drive 12 of FIG. 1, is set forth according to an embodiment of the invention. As described in detail below, technique 130 dynamically adjusts voltage and frequency applied to the motor based on motor or load demand, which effectively adjusts the shape or profile of the pre-set V/Hz curve internal to motor drive 12. Technique 130 monitors the trend of a motor parameter until an optimal operation point is determined. While adjusting voltage and frequency, technique 130 also monitors for abrupt load changes or motor instabilities, which may signify potential motor failure.

Technique 130 begins at STEP 132 by supplying an initial, default, or start-up set of voltage-frequency commands to a command generator. Default or start-up set of voltage-frequency commands may be, for example, based on voltage-frequency commands of a pre-set or static V/Hz curve or saved voltage-frequency commands from a previous successful start-up event. At STEP 134 the signal generator transmits a switching signal to an inverter to regulate input power to the motor. An array of sensors monitor a DC bus voltage and current output from the motor drive at STEP 136. Using the monitored voltage and current, technique 130 calculates or estimates a value of a variable real-time motor parameter at STEP 138. The real-time motor parameter may correspond to a motor power factor, motor efficiency, motor slip, motor torque, or motor temperature, for example. In one embodiment, a plurality of real-time motor parameters relating to distinct motor conditions (e.g., motor power factor and motor temperature) may be calculated at STEP 138. At STEP 140, the controller increments the voltage-frequency command by a pulse value, thereby causing a modified switching signal to be transmitted to the inverter based on the incremented voltage-frequency command. In one embodiment, the controller increments the voltage-frequency command by a pulse value of −10 volts. That is, the incremented voltage-frequency command is 10 volts lower than the default voltage-frequency command.

At STEP 142, technique 130 uses an array of sensors to monitor current output from the motor drive generated according to the incremented voltage-frequency command. Technique 130 also measures a DC bus voltage and calculates motor line voltages from the measured DC bus voltage and PWM switching signals. Using the monitored real-time line voltage and current, technique 130 calculates or estimates a real-time motor parameter at STEP 144. Similar to the real-time motor parameter described with respect to STEP 138, the real-time motor parameter may correspond to a motor power factor, motor efficiency, or motor slip, for example. At STEP 146, technique 130 analyzes the real-time motor parameter via a comparison between the real-time motor parameter calculated at STEP 138 and the real-time motor parameter calculated at STEP 144. Specifically, technique 130 determines a motor parameter trend, which corresponds to a rate-of-change (i.e., slope) between the real-time motor parameter of STEP 138 to the real-time motor parameter of STEP 144.

At STEP 148, technique 130 determines whether the incremented voltage-frequency command created a stable motor operating condition. To determine if a stable operating condition exists, technique 130 may analyze the monitored real-time line voltage and current, a change in value between reference line voltage and/or current and real-time line voltage and/or current measurements, one or more real-time motor parameters values, and/or the motor parameter trend to determine an instability identification parameter. An instability identification parameter may be reflected by an abrupt change in line voltage or current, an abrupt change in a motor parameter, or by the value of the real-time motor parameter, such as, for example, a motor temperature, torque, slip, power factor, or efficiency outside a threshold. Optionally, technique 130 may also detect an undesirable operation condition after altering the voltage-frequency command, such as, for example, a motor parameter value above or below a pre-set boundary value.

If a stable motor operating condition is detected 150 at STEP 148, technique 130 determines whether the incremented voltage-frequency command has caused the motor drive to operate at an optimal operation point at STEP 152. In analyzing whether the incremented voltage-frequency command has caused the motor drive to operate at an optimal operation point, technique 130 analyzes a specified motor associated with/corresponding to each voltage-frequency command, which can be derived from the motor drive voltage/current output resulting from each voltage-frequency command. According to an exemplary embodiment, technique 130 analyzes motor power factor or motor efficiency values associated with or corresponding to each voltage-frequency command. More specifically, technique 130 analyzes a trend of the motor parameter by comparing the most recent pair of successive voltage-frequency settings to determine if the real-time value of the motor parameter is at a peak value. If the motor parameter trend indicates no change (i.e., zero slope) between the real-time motor parameter of STEP 138 and the real-time motor parameter of STEP 144, technique 130 determines that the real-time motor parameter of STEP 144 is at a peak value and the motor drive is operating at an optimal operation point 154.

Alternatively, technique 130 may determine that the motor drive is operating at an optimal operation point 154 if the motor parameter is within a pre-set range or threshold from the optimal operation point, such as where the rate-of-change of the motor parameter approaches is minimal (i.e., slope approaches zero). If the motor drive is operating at the optimal operation point (or within the pre-set threshold from the optimal operation point) 154, technique 130 maintains the current real-time voltage-frequency command to the motor drive at STEP 156. That is, the voltage-frequency command corresponding to the optimal (i.e., peak) motor parameter value is maintained, thereby causing the signal generator to transmit a modified switching signal to an inverter to regulate an input power to the motor.

However, if a determination is made at STEP 152 that the motor drive is not operating at optimal operation point 160, technique 130 returns to STEP 140 and modifies the previous voltage-frequency command by incrementing the previous voltage-frequency command by the pulse value. Technique 130 then continues to STEP 142 to monitor the new real-time line voltage and current resulting from the incremented voltage-frequency command. At STEP 144, new real-time motor parameters are determined. The new real-time motor parameters are analyzed at STEP 146 by comparing them with the previously acquired real-time motor parameters corresponding to the previous voltage-frequency command. Technique 130 continues through STEPS 148 and 152, and, if an optimal operation condition is not determined 160, technique 130 returns to STEP 140.

Referring back to STEP 148, if a motor instability condition or motor failure condition is detected 162, technique 130 attempts to determine if a stable motor operating condition may be attained at STEP 164. Technique 130 may determine, for example, that a stable condition is attainable 166 and determine how to correct the motor instability based on the motor parameter trend. As discussed above, according to one embodiment, an optimal operating condition is indicated by a peak motor parameter, which corresponds to the motor parameter trend having a value of zero. Thus, a change in the motor parameter trend (i.e., rate-of-change) from a positive value to a negative value (or, alternatively, from a negative value to a positive value) may indicate that the previous increment of the voltage-frequency command effectively "overshot" the peak value of the motor parameter. At STEP 168, controller increments the voltage-frequency command to reach the stable condition by backtracking to the last stable condition or attempting to correct the overshoot by decreasing the previously used increment or pulse value of the voltage-frequency command. For example, if the previous pulse value was −10 volts, technique 130 may increase the previously incremented voltage-frequency command by +5 volts to reach a stable point between the two most recent increments of the voltage-frequency command. Once a stable condition is achieved, technique returns to STEP 142.

However, if technique 130 determines that a stable condition is not attainable 170 at STEP 164, technique 130 resets the control system to the pre-set V/Hz profile and returns to STEP 132, where technique 130 operates according to the pre-set V/Hz profile to maintain system stability until the load operating point is stable.

Optionally, technique 130 may monitor for a load change or reference frequency change while maintaining a given voltage-frequency command. If a load change or reference frequency change is detected, technique 130 may reset to a default frequency command. If a load change or reference frequency change is not detected, technique may continue to maintain the current voltage-frequency command.

Figure 5:
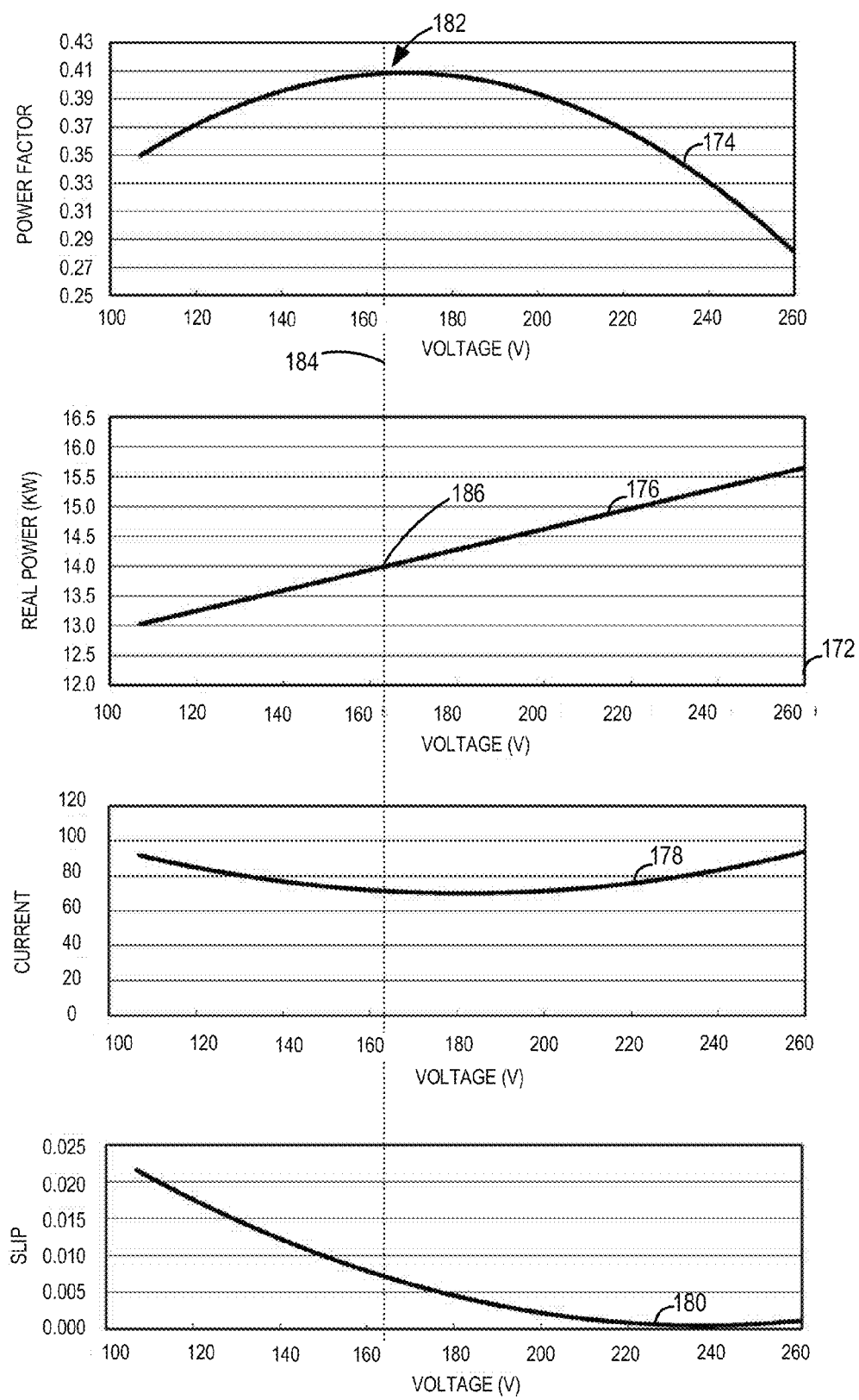
FIG. 5 is a series of exemplary graphs of real-time motor parameters for the motor drive control technique of FIG. 4.

FIG. 5 shows a series of graphs of real-time motor parameters determined using a control technique such as that described with respect to FIGS. 1-4 for a motor having a rated power of approximately 125 hp, which corresponds to a full voltage 172 of approximately 268.4 V of a static and pre-set linear V/Hz curve with a 35 Hz frequency command. FIG. 5 illustrates motor power factor 174, input real power 176, motor current 178, and motor slip 180 as a function of voltage. As shown, input real power 176 follows an approximately linear path as voltage is decreased from rated power while keeping the frequency command constant at 35 Hz. Motor power factor 174, however, follows an approximately quadratic curve. Viewing real power 176 and motor power factor 174 together, as voltage decreases from the rated power, power factor 174 increases until it reaches a peak 182 at approximately 168 V. As voltage decreases further, power factor 174 decreases as well. At peak 182 an optimal operating point 184 occurs. By reducing voltage from full voltage 172 of the pre-set V/Hz curve to 168 V corresponding to peak 182 of the motor power factor 174, motor input real power 176 is reduced to an optimal operating power 186 of approximately 14 kW. Thus, by decreasing voltage to reach operating point 184, real power 176 is reduced.

While additional energy savings may be possible by reducing the voltage beyond operating point 184, such a decrease may have negative effects on motor stability if voltage is reduced too much. As shown in FIG. 5, at voltage values less than approximately 168 V, slip 180 increases rapidly. A slip 180 greater than approximately 3% may be undesirable and can cause motor instability. Therefore, operating point 184 may be selected as an optimal operating point since it ensures that slip 180 stays below the pre-defined slip boundary of 3%. Also, at voltages beyond operating point 184, current 178 increases as well, potentially leading to an over-current condition.

FIG. 6 illustrates real-time energy savings 188 achieved using the dynamic energy-optimizing control strategy set forth with respect to FIG. 4. Load characteristic curve 190 is a characteristic torque/speed curve that describes a certain load, such as, for example, a pump. Curve 192 is a torque/speed curve of a traditional motor drive operated at an operating point with a given frequency command $f_{cmd}$ according to a static and pre-set V/Hz curve. According to one embodiment, frequency command $f_{cmd}$ may be equal to a frequency reference $f_{ref}$, which is typically given to the drive by the user or an outer-loop controller. The drive controls the motor to have an actual fundamental frequency of $f_1$ that closely tracks the frequency command $f_{cmd}$. The actual fundamental frequency $f_1$ in the motor determines the motor synchronous speed $\omega_{syn}$ by:

$$\omega_{syn} = \frac{120 f_1}{p}, \qquad \text{(Eqn. 3)}$$

where p is the number of poles. Synchronous speed is a constant value for a certain motor at a fixed frequency. It is an imaginary maximum possible speed that the motor could reach under absolute no-load conditions, or when torque is zero.) The intersection point 194 between curve 190 and curve 192 determines the actual operating point of the motor under this condition, with a motor speed $\omega_1$ 196 and an output torque $T_1$ 198.

Curve 200 is a torque/speed curve of an optimized motor drive operated at an optimal operating point with the same frequency command $f_{cmd}$ (as results, same actual frequency $f_1$ and synchronous speed $\omega_{syn}$), such as operating point 184 of FIG. 5. The intersection point 202 between curve 200 and curve 190 determines the actual operating point of the motor under this optimal operating condition, with a motor speed $\omega_2$ 204 and an output torque $T_2$ 206.

As shown in FIG. 6, at a given frequency command $f_{cmd}$, the traditional motor drive operates at torque 198. The optimized motor drive, on the other hand, operates at a significantly lower torque 206. This decrease in torque from operation point 194 to operation point 202 results in reduced input power 188 and therefore energy savings. It is noticeable that as the optimizing control is applied, the actual motor speed typically drops slightly depending on the torque/speed characteristic curve of a specific load. This is typically acceptable for applications where precise speed control is not needed, such as pump, compressors, and fans.

According to one embodiment of the invention, energy savings 188 may be calculated based on a comparison of the initial voltage-frequency command and the modified voltage-frequency command corresponding to the optimal value of the motor parameter, and displayed as a digital power savings value on a motor drive, such as motor drive 12 of FIG. 1, for example. The displayed energy savings may indicate either an instantaneous energy savings and/or a cumulative energy savings over a pre-set time period or during the lifetime of the drive. Also, energy savings 188 may be used to calculate a carbon reduction resulting from the decreased energy usage, which may be displayed on a carbon reduction meter on motor drive 12.

Figure 7:
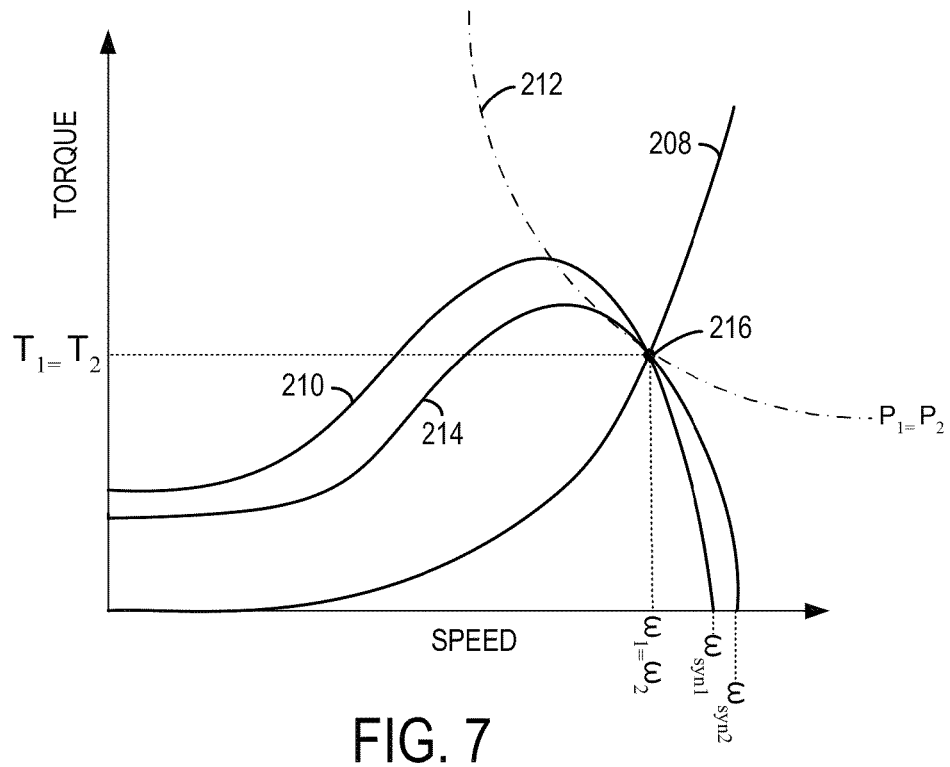
FIG. 7 is an exemplary graph illustrating energy savings for a given motor drive operated according to the motor drive control technique of FIG. 4 according to an embodiment of the invention.

Referring now to FIG. 7, an optimized torque speed curve is illustrated for applications where precise speed control is desired according to an embodiment of the invention. Load characteristic curve 208 is a characteristic torque/speed curve that describes a certain load, such as, for example, a pump. A first motor characteristic curve 210 represents a torque/speed curve of a traditional motor drive operated at an operating point with a given frequency command $f_{cmd}$ according to a static and pre-set V/Hz curve 212. A second motor characteristic curve 214 is a torque/speed curve of an optimized motor drive. As shown in FIG. 7, curves 210, 214 intersect load characteristic curve 208 at an intersection point 216 having a common speed and torque.

This intersection point 216 is a result of operating a motor drive in an application where precise speed control is desired. In such an application, an outer-loop process controller is typically included to adjust the frequency command and, together with energy optimizing control method described with respect to FIG. 4, settle the motor operating point to the intersection point 216 of curves 208 and 212. In this example, the outer-loop controller will slightly increase the frequency command $f_{cmd}$ so that it is slightly greater than the frequency reference $f_{ref}$ (in turn, the synchronous speed, from $\omega_{syn1}$ to $\omega_{syn2}$) and eventually settle down to the original operating point at speed $\omega_1$ and output torque $T_1$. The output power P2 will be equal to the original output power P1.

However, because the second motor characteristic curve 214 is associated with lower voltage applied to the motor, the motor core losses will be reduced. Therefore, energy saving are achieved from the motor core loss reduction at a reduced voltage. A stable operation is achievable with the interactions between the energy-optimizing algorithm and the external process controller, because in this system, the outer-loop process control time constant (in tens of seconds or minutes) is at least 10 times faster than the time constant of the energy-optimizing algorithm (in seconds).

Figure 8:
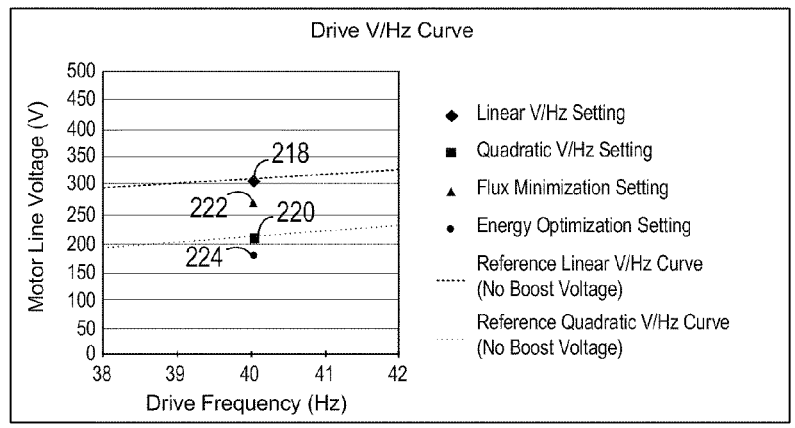
FIGS. 8-10 are a series of exemplary graphs illustrating a comparison of a number of motor drive control techniques.
Figure 9:
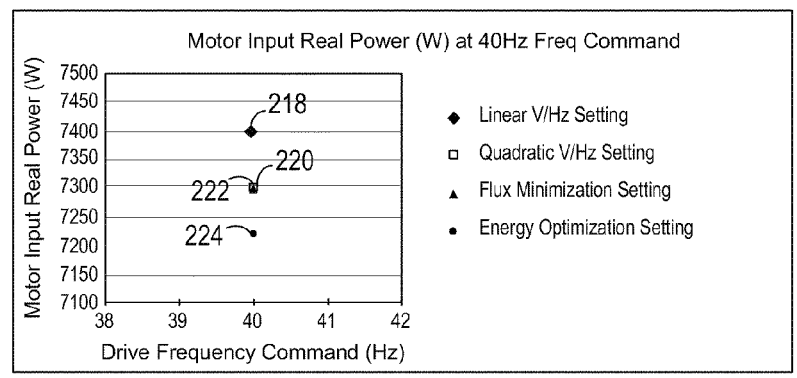
Figure 10:
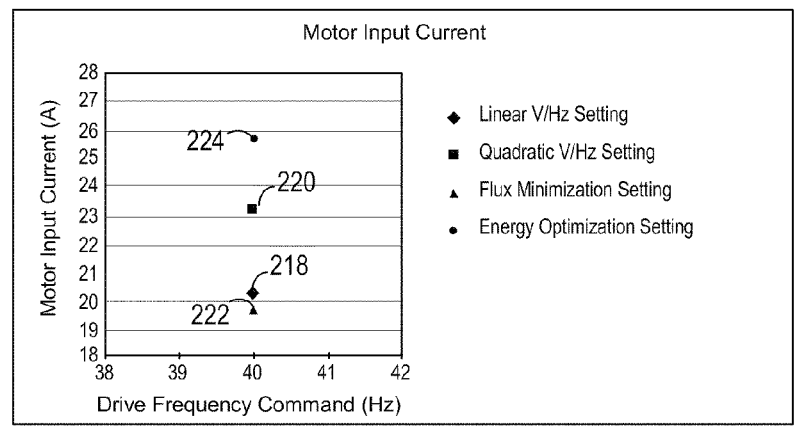

FIGS. 8-10 show a comparison of motor voltage (FIG. 8), motor input current (FIG. 9), and motor input real power (FIG. 10) measured under four different motor drive control conditions using a 50 hp open-loop motor drive at 40 Hz operation: a Linear V/Hz setting 218; a Quadratic V/Hz setting 220; a Flux Minimization setting 222; and an energy optimization setting 224, such as that described with respect to FIG. 4. As shown in FIGS. 8-10, the Flux Minimization setting 222 gives the minimal current and the energy optimization setting 224 gives the minimal input real power, which leads to maximum energy savings.

While several embodiments of the invention are described with respect to an AC motor and AC motor drive, it is contemplated that the energy-optimizing technique set forth herein may be applied to a wide variety of applications. For example, the energy-optimizing technique may be used in hybrid vehicles to minimize power output or draw from a battery system or in an uninterruptible power supply (UPS) with a variable load, such as for lighting systems. The technique may also be used in any application that uses a PWM inverter, such as, for example, semiconductor applications having PWM power converters or in general inverter applications to change a switching algorithm. The technique can be used for a variety of voltage levels, including low-voltage, medium-voltage and high-voltage applications.

A technical contribution for the disclosed method and apparatus is that it provides for a control unit-implemented technique for modifying a voltage-frequency command of an AC motor drive. Based on a modified voltage-frequency command, the technique controls switching time of a series of switches in a motor control device to reduce a motor torque and a motor input power.

The control system for controlling an AC motor drive can be viewed as having units (virtual) to perform or conduct the aforementioned acts of a processor. For example, the control system comprises a unit to input an initial voltage-frequency command to the AC motor drive; a unit to receive a real-time output of the AC motor drive generated according to the initial voltage-frequency command; and a unit to determine a real-time value of a motor parameter based on the real-time output of the AC motor drive. The control system also comprises a unit to input a plurality of modified voltage-frequency commands to the AC motor drive; a unit to determine the real-time value of the motor parameter corresponding to each of the plurality of modified voltage-frequency commands; a unit to identify an optimal value of the motor parameter based on the real-time values of the motor parameter; and a unit to maintain an input of a current modified voltage-frequency command when the real-time value of the motor parameter corresponds to the optimal value of the motor parameter.

Therefore, according to one embodiment of the present invention, a control system is provided for controlling an AC motor drive. The control system is programmed to input an initial voltage-frequency command to the AC motor drive, receive a real-time output of the AC motor drive generated according to the initial voltage-frequency command, and determine a real-time value of a motor parameter based on the real-time output of the AC motor drive. The control system is also programmed to input a plurality of modified voltage-frequency commands to the AC motor drive and determine the real-time value of the motor parameter corresponding to each of the plurality of modified voltage-frequency commands. The control system is further programmed to identify an optimal value of the motor parameter based on the real-time values of the motor parameter, and maintain an input of a current modified voltage-frequency command when the real-time value of the motor parameter corresponds to the optimal value of the motor parameter.

According to another embodiment of the present invention, a method for controlling a motor drive output includes operating a motor drive according to a static voltage-frequency profile to generate an output power and determining a value of a specified motor parameter corresponding to the static voltage-frequency profile. The method also includes selectively modifying the static voltage-frequency profile during operation of the motor drive to generate a reduced motor input power. The step of selectively modifying the default voltage-frequency profile includes adjusting a voltage-frequency setting during operation of the motor drive such that a reduced motor input power is generated according to a dynamic voltage-frequency profile, determining a value of the specified motor parameter for each voltage-frequency setting of the dynamic voltage-frequency profile, and operating the motor drive at a voltage-frequency setting corresponding to a peak value of the specified motor parameter.

According to yet another embodiment of the present invention, a motor drive is configured to supply power to a load. The motor drive includes an inverter designed to provide power to the load and a controller operationally connected to control operation of the inverter. The controller is configured to cause the inverter to operate according to an initial voltage-frequency setting, adjust the voltage-frequency setting during operation of the motor drive to cause the inverter to operate according to each of a plurality of varied voltage-frequency settings, and monitor a real-time value of a motor parameter corresponding to each voltage-frequency setting. The controller is further configured to identify an optimal value for the motor parameter based on the monitored real-time values of the motor parameter and cause the inverter to operate according to the voltage-frequency setting corresponding to the identified optimal value for the motor parameter.

The present invention has been described in terms of the preferred embodiment, and it is recognized that equivalents, alternatives, and modifications, aside from those expressly stated, are possible and within the scope of the appending claims.

What is claimed is:

1. A control system for controlling an AC motor drive, the control system programmed to:
   input an initial voltage-frequency command to the AC motor drive corresponding to a static voltage-frequency profile;
   receive a real-time output of the AC motor drive generated according to the initial voltage-frequency command;
   determine a real-time value of a motor parameter based on the real-time output of the AC motor drive;
   input a plurality of modified voltage-frequency commands to the AC motor drive corresponding to a dynamic voltage-frequency profile;
   determine the real-time value of the motor parameter corresponding to each of the plurality of modified voltage-frequency commands;
   identify an optimal value of the motor parameter based on the real-time values of the motor parameter; and
   maintain an input of a current modified voltage-frequency command when the real-time value of the motor parameter corresponds to the optimal value of the motor parameter, wherein the current modified voltage-frequency command corresponds to a peak value of the motor parameter.

2. The control system of claim 1 programmed to monitor a rate-of-change of the real-time value of the motor parameter.

3. The control system of claim 2 wherein the optimal value of the motor parameter comprises a value of the real-time value of the motor parameter where the rate-of-change of the real-time value of the motor parameter switches sign.

4. The control system of claim 3 programmed to maintain the voltage-frequency command when the real-time value of the motor parameter is within a specified range of the peak value of the motor parameter.

5. The control system of claim 1 wherein the motor parameter comprises one of a motor rms voltage, a motor rms current, a motor input power, a motor speed, a motor slip, a motor power factor, a motor efficiency, and a motor temperature.

6. The control system of claim 1 programmed to determine a value of at least one of an instability identification parameter and an undesirable operation parameter based on the received real-time output of the AC motor drive, the instability identification parameter comprising at least one of a motor voltage, a motor current, a motor torque, a motor speed, a motor slip, a motor power factor, a motor efficiency, and a motor temperature.

7. The control system of claim 6 programmed to:
   detect a motor instability condition based on the value of the instability identification parameter; and
   adjust the voltage-frequency command if the motor instability condition is detected.

8. The control system of claim 7 programmed to reset the voltage-frequency command within a number of execution cycles to match a pre-set voltage-frequency curve if the motor instability condition is detected.

9. The control system of claim 6 programmed to:
   detect a undesirable motor condition based on the value of the undesirable operation parameter; and
   adjust the voltage-frequency command if the undesirable motor condition is detected.

10. The control system of claim 1 wherein the real-time output of the AC motor drive comprises at least one of a real-time voltage and a real-time current.

11. The control system of claim 10 programmed to detect a motor instability condition based on a value or a rate-of-change of the at least one of a motor power factor, efficiency, motor slip, voltage, current, torque, and temperature.

12. The control system of claim 1 programmed to incrementally increase or decrease the voltage-frequency command to modify the voltage-frequency command.

13. The control system of claim 1 programmed to:
   compare the initial voltage-frequency command and the modified voltage-frequency command corresponding to the optimal value of the motor parameter; and
   determine a power savings based on the comparison.

14. A method for controlling a motor drive output comprising:
   operating a motor drive according to a static voltage-frequency profile to generate an output power;
   determining a value of a specified motor parameter corresponding to the static voltage-frequency profile; and
   selectively modifying the static voltage-frequency profile during operation of the motor drive to generate a reduced motor input power;
   wherein selectively modifying the default voltage-frequency profile comprises:
      adjusting a voltage-frequency setting during operation of the motor drive such that a reduced motor input power is generated according to a dynamic voltage-frequency profile;
      determining a value of the specified motor parameter for each voltage-frequency setting of the dynamic voltage-frequency profile; and
   operating the motor drive at a voltage-frequency setting corresponding to a peak value of the specified motor parameter.

15. The method of claim 14 further comprising monitoring a trend of the value of the specified motor parameter to identify the peak value of the specified motor parameter.

16. The method of claim 14 wherein determining the value of a specified motor parameter comprises determining the value of one of a motor rms voltage, a motor rms current, a motor input power, a motor speed, a motor slip, a motor power factor, a motor efficiency, and a motor temperature.

17. The method of claim 14 wherein adjusting the voltage-frequency setting comprises adjusting one of a voltage command and a frequency command to adjust a voltage-frequency ratio at a frequency reference, thereby minimizing a motor torque and a motor power at the frequency reference.

18. A motor drive configured to supply power to a load, the motor drive comprising:
   an inverter designed to provide power to the load; and
   a controller operationally connected to control operation of the inverter, the controller configured to:
      cause the inverter to operate according to an initial voltage-frequency setting of a static voltage-frequency profile;
      adjust the voltage-frequency setting during operation of the motor drive to cause the inverter to operate according to each of a plurality of varied voltage-frequency settings of a dynamic voltage-frequency profile;
      monitor a real-time value of a motor parameter corresponding to the varied voltage-frequency settings;
      identify an optimal value for the motor parameter based on the monitored real-time values of the motor parameter; and
      cause the inverter to operate according to the voltage-frequency setting corresponding to the identified optimal value for the motor parameter, the voltage-frequency setting corresponding to a peak value of the motor parameter.

19. The motor drive of claim 18 wherein the controller is configured to determine a rate-of-change of the real-time value of the motor parameter corresponding to a most recent pair of successive voltage-frequency settings in the plurality of varied voltage-frequency settings.

20. The motor drive of claim 19 wherein the optimal value comprises a peak value of the motor parameter where the rate-of-change between the real-time value of the motor parameter and a previously determined value of the motor parameter switches from one of a positive rate-of-change to a negative rate-of-change and a negative rate-of-change to a positive rate-of-change.

21. The control system of claim 20 wherein the controller is configured to cause the inverter to operate according to the voltage-frequency setting corresponding to the optimal value when the real-time value of the motor parameter is at the peak value or within a specified range of the peak value.

22. The control system of claim 18 wherein the monitored real-time motor parameter comprises one of a motor power factor and a motor efficiency.

23. The control system of claim 18 wherein the controller is configured to:
   detect an undesirable motor condition based on a real-time value of at least one of a motor power factor, efficiency, motor slip, voltage, current, torque, and temperature; and
   upon detection of the undesirable motor condition, reset the voltage-frequency setting to one of the initial voltage-frequency setting and a linear voltage-frequency setting.

24. The control system of claim 18 wherein the controller is configured to adjust at least one of a motor voltage and a motor frequency to adjust the voltage-frequency setting during operation of the motor drive.

25. The control system of claim 24 wherein the controller is configured to adjust the at least one of the motor voltage and the motor frequency to minimize at least one of a motor torque and a motor input power.

* * * * *